(12) United States Patent
Okazaki

(10) Patent No.: US 10,158,204 B2
(45) Date of Patent: Dec. 18, 2018

(54) FIXING STRUCTURE OF CONDUCTOR UNIT

(71) Applicant: Yazaki Corporation, Tokyo (JP)

(72) Inventor: Yutaro Okazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/793,946

(22) Filed: Oct. 25, 2017

(65) Prior Publication Data

US 2018/0166840 A1    Jun. 14, 2018

(30) Foreign Application Priority Data

Dec. 9, 2016  (JP) ................................. 2016-239795

(51) Int. Cl.
| | | |
|---|---|---|
| *H01R 4/30* | (2006.01) | |
| *H01R 25/16* | (2006.01) | |
| *H01M 10/6554* | (2014.01) | |
| *H01M 2/20* | (2006.01) | |
| *H01R 4/18* | (2006.01) | |

(Continued)

(52) U.S. Cl.
CPC ........... *H01R 25/162* (2013.01); *H01H 85/20* (2013.01); *H01H 85/50* (2013.01); *H01M 2/20* (2013.01); *H01M 2/206* (2013.01); *H01M 10/6554* (2015.04); *H01R 4/185* (2013.01); *H01R 11/28* (2013.01); *H01R 11/281* (2013.01); *H01R 13/405* (2013.01); *H02H 7/18* (2013.01);

(Continued)

(58) Field of Classification Search
CPC .......... H01R 13/025; H01R 4/30; H01R 4/62; H01R 43/16; G01R 31/3696

USPC ........ 174/84 C; 439/76.2, 754, 762; 320/105
See application file for complete search history.

(56) References Cited

U.S. PATENT DOCUMENTS 5,645,448 A * 7/1997 Hill ...................... H01H 85/205
                                                                439/522
6,225,788 B1   5/2001 Kouzu et al.
(Continued)

FOREIGN PATENT DOCUMENTS

| JP | 2-14750 U | 1/1990 |
|---|---|---|
| JP | 11-111349 A | 4/1999 |

(Continued)

OTHER PUBLICATIONS

Japanese Office Action for the related Japanese Patent Application No. 2016-239795 dated Nov. 6, 2018.

*Primary Examiner* — Chau N Nguyen
(74) *Attorney, Agent, or Firm* — Kenealy Vaidya LLP

(57) ABSTRACT

A conductor unit includes a connection conductor directly or indirectly connected with at least one electrode terminal in an electrode terminal group of a plurality of battery cells arranged in the same direction, a linear conductor connected with a battery monitoring unit that monitors the battery conditions of the battery cells, a fusible body that is connected between the connection conductor and the linear conductor and fuses when an overcurrent flows between the connection conductor and the linear conductor, and an insulative resin-molded member that contains the fusible body therein. The connection conductor includes holding portions that are disposed inside the resin-molded member, and hold the resin-molded member. The holding portions are formed in at least two places spaced apart from each other.

4 Claims, 7 Drawing Sheets

(51) Int. Cl.
*H01R 11/28* (2006.01)
*H02H 7/18* (2006.01)
*H01H 85/20* (2006.01)
*H01H 85/50* (2006.01)
*H02J 7/00* (2006.01)
*H01R 13/405* (2006.01)
*H01M 2/10* (2006.01)
*H01R 13/68* (2011.01)

(52) U.S. Cl.
CPC ............. *H02J 7/00* (2013.01); *H01M 2/1077* (2013.01); *H01M 2220/20* (2013.01); *H01R 13/68* (2013.01)

(56) References Cited

U.S. PATENT DOCUMENTS

| | | | |
|---|---|---|---|
| 6,344,728 B1 | 2/2002 | Kouzu et al. | |
| 6,411,063 B1 | 6/2002 | Kouzu et al. | |
| 7,578,710 B2* | 8/2009 | Koelle | G01R 1/203 439/762 |
| 8,142,237 B2* | 3/2012 | Condamin | G01R 1/203 324/117 R |
| 2011/0076888 A1* | 3/2011 | Fernandez | H01M 10/48 439/620.01 |

FOREIGN PATENT DOCUMENTS

| | | |
|---|---|---|
| JP | 2011-70900 A | 4/2011 |
| JP | 2015-207393 A | 11/2015 |

* cited by examiner

FIXING STRUCTURE OF CONDUCTOR UNIT

CROSS-REFERENCE TO RELATED APPLICATION(S)

The present application claims priority to and incorporates by reference the entire contents of Japanese Patent Application No. 2016-239795 filed in Japan on Dec. 9, 2016.

BACKGROUND OF THE INVENTION

1. Field of the Invention

The present invention relates to a fixing structure of a conductor unit.

2. Description of the Related Art

Conventionally, a battery module constituted of a plurality of battery cells, and a battery monitoring unit for monitoring a battery state of each of the battery cells have been mounted on a vehicle, such as an electric vehicle (EV) or a hybrid electric vehicle (HEV). The battery cells and the battery monitoring unit are connected with each other via conductive modules. The conductive module is, in some cases, provided with a connection conductor, such as a bus bar connected with an electrode terminal of the battery cell; a linear conductor, such as an electric wire connected with the battery monitoring unit; a fuse interposed between the connection conductor and the linear conductor; and a casing that houses the above-mentioned components. For example, Japanese Patent Application Laid-open No. 2015-207393 discloses a conductive module provided with a conductor that connects a plurality of battery cells in series, and connects a battery module with a battery monitoring unit; and a casing that houses a plurality of conductors, the casing being provided with an attachment portion of a fuse.

The conventional conductive module mentioned above arranges a housing unit for a plurality of connection conductors, connection parts for a plurality of fuses, and the like, in the casing, and this makes it difficult to miniaturize the conductive module. When the fuse and the connection conductor are molded with resin or the like, and fixed to each other to eliminate the casing from the conductive module, vibrations or impacts in vehicle traveling may apply a stress to between a portion molded with resin and the connection conductor and hence, it is desired that the portion molded with resin and the connection conductor have high rigidity and resistance against vibration.

SUMMARY OF THE INVENTION

It is an object of the present invention to provide a fixing structure of a conductor unit that is capable of improving the rigidity and resistance against vibration of a conductor.

In order to achieve the above mentioned object, a fixing structure of a conductor unit according to one aspect of the present invention includes a connection conductor that is connected directly or indirectly with at least one electrode terminal in an electrode terminal group of a plurality of battery cells arranged in a same direction; a linear conductor connected with a battery monitoring unit configured to monitor the battery conditions of the battery cells; a fusible body that is connected between the connection conductor and the linear conductor, the fusible body being configured to fuse when an overcurrent flows between the connection conductor and the linear conductor; and an insulative resin-molded member that contains the fusible body inside the insulative resin-molded member, wherein the connection conductor includes holding portions that are disposed inside the resin-molded member and hold the resin-molded member, and the holding portions are formed in at least two places spaced apart from each other.

According to another aspect of the present invention, in the fixing structure of the conductor unit, it is preferable that each of the holding portions projects in a direction orthogonal to the arrangement direction of the battery cells, and at least one of the holding portions serves as a connection portion configured to electrically connect the fusible body and the connection conductor with each other.

According to still another aspect of the present invention, in the fixing structure of the conductor unit, it is preferable that the resin-molded member is formed in such a manner that an outside bottom surface of the resin-molded member facing the battery cell is located coplanar with a side face of the battery cell or located on a side opposite to the battery cell with respect to the side face of the battery cell, in a state where the connection conductor is connected with the electrode terminal.

According to still another aspect of the present invention, in the fixing structure of the conductor unit, it is preferable that the holding portion is formed in a plate-like shape, and provided with at least one through hole, and a part of the resin-molded member is disposed inside the through hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a fixing structure of a conductor unit according to the present invention are explained in detail based on drawings. Here, the present invention is not limited to the following embodiments. Furthermore, constitutional features in the following embodiments include a part that is replaceable or easily replaced by those skilled in the art, or parts substantially identical with each other. In addition, various abbreviations, substitutions, or modifications of the constitutional features in the embodiments described below can be made without departing from the gist of the present invention.

First Embodiment

Figure 1:
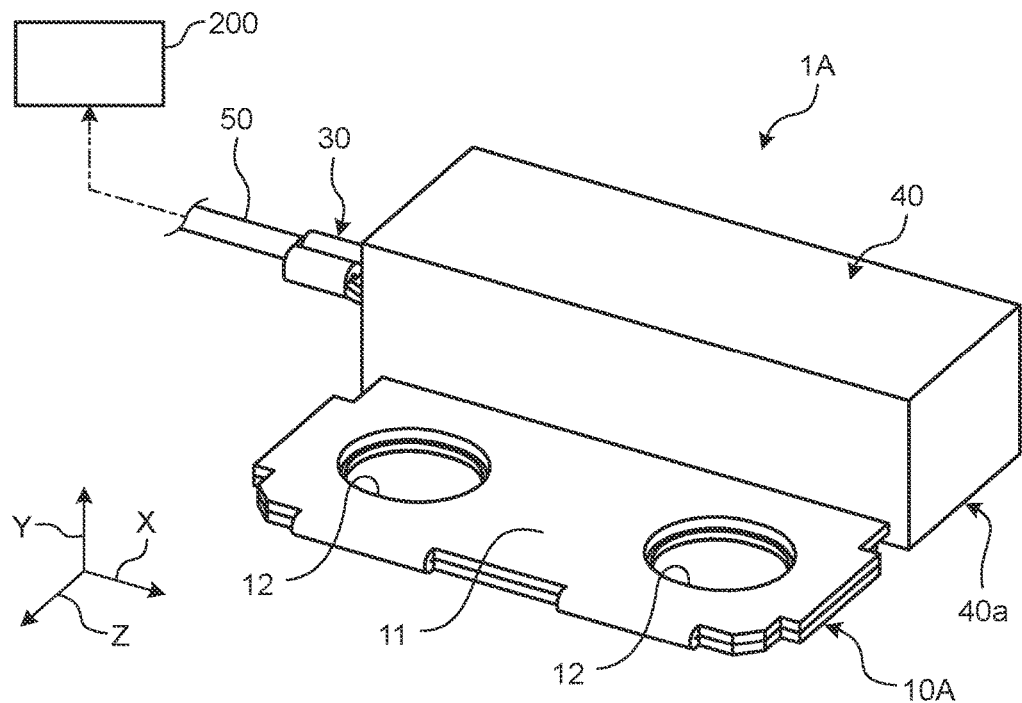
FIG. 1 is a perspective view illustrating one example of an external appearance of a fixing structure of a conductor unit according to a first embodiment.
Figure 2:
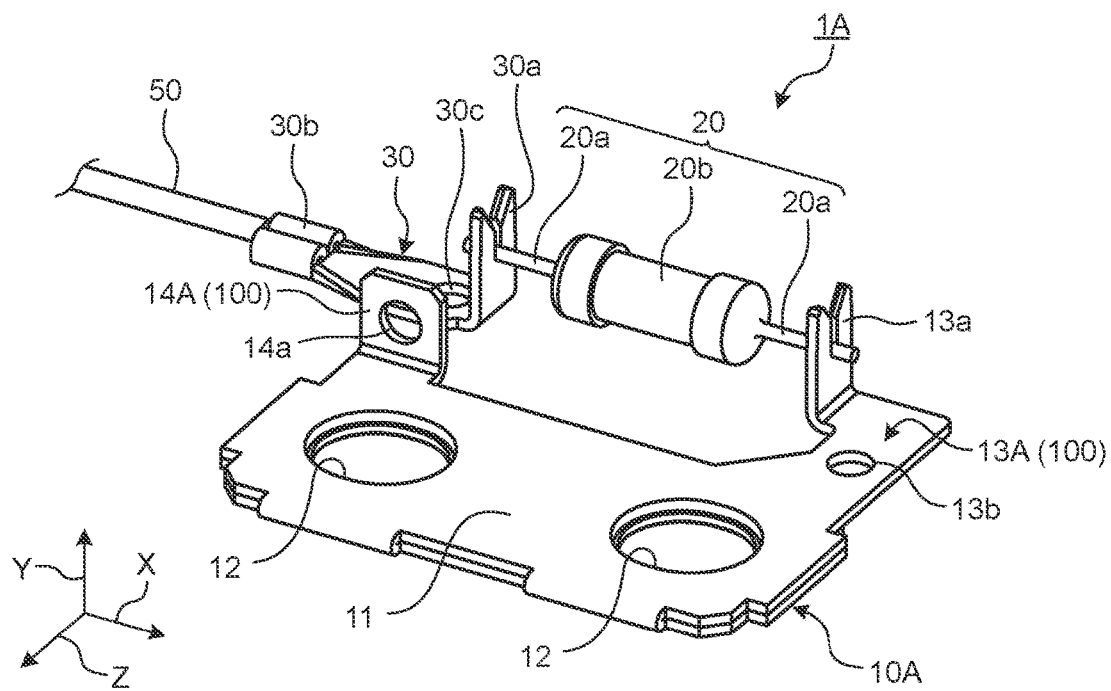
FIG. 2 is a perspective view illustrating a schematic structure of the fixing structure of the conductor unit according to the first embodiment.
Figure 3:
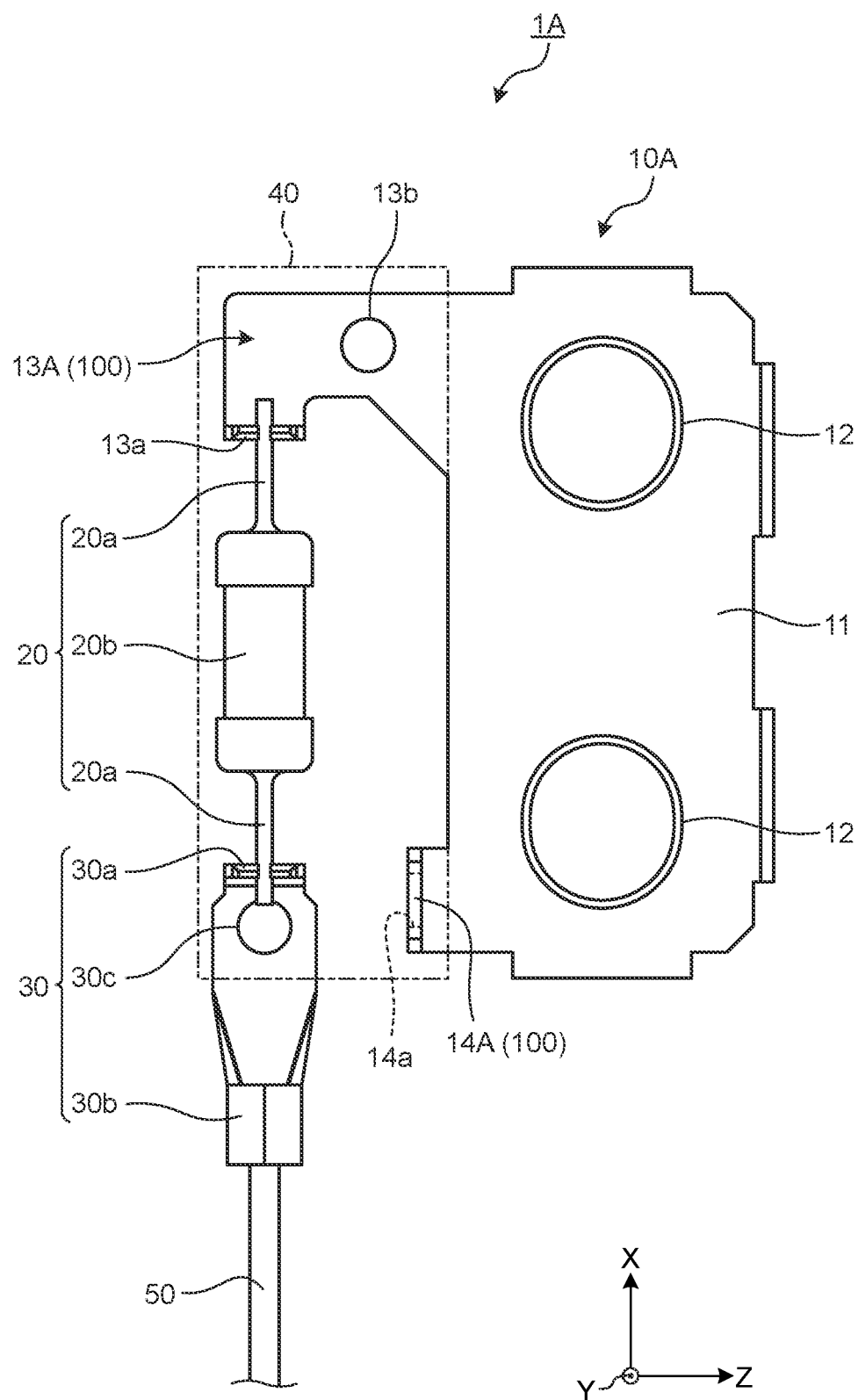
FIG. 3 is a plan view illustrating the schematic structure of the fixing structure of the conductor unit according to the first embodiment.
Figure 4:
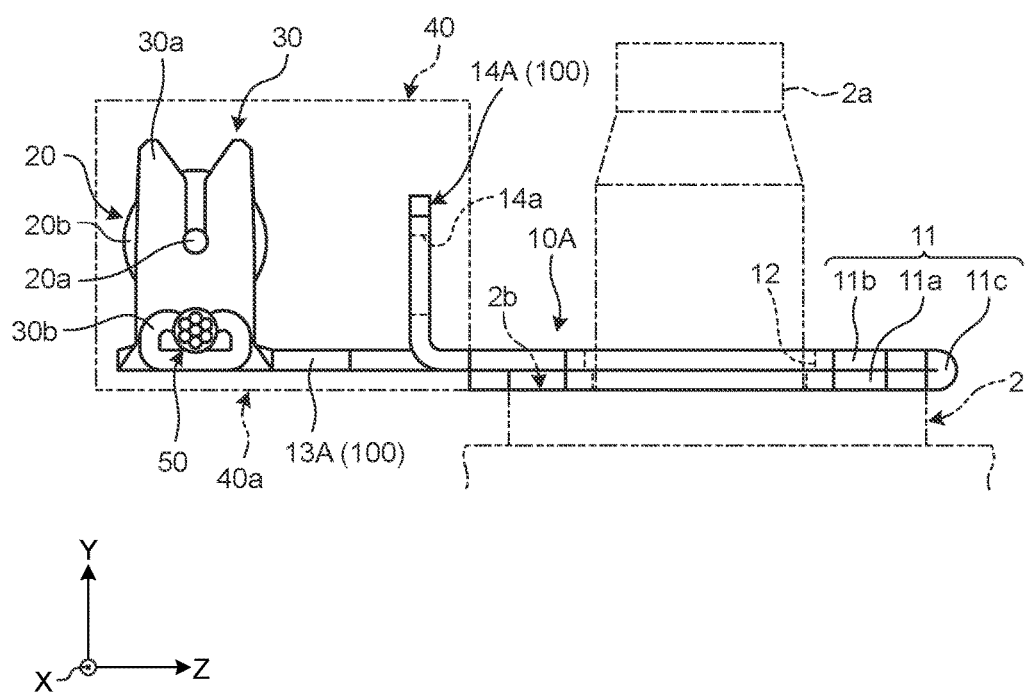
FIG. 4 is a side view illustrating the schematic structure of the fixing structure of the conductor unit according to the first embodiment.

A fixing structure of a conductor unit according to the first embodiment is explained. FIG. 1 is a perspective view illustrating one example of the external appearance of the fixing structure of the conductor unit according to the first embodiment. FIG. 2 is a perspective view illustrating the schematic structure of the fixing structure of the conductor unit according to the first embodiment. FIG. 3 is a plan view illustrating the schematic structure of the fixing structure of the conductor unit according to the first embodiment. FIG. 4 is a side view illustrating the schematic structure of the fixing structure of the conductor unit according to the first embodiment. Here, in FIG. 2 to FIG. 4, for the sake of brevity, illustration of a resin-molded member are omitted (also omitted in FIG. 6 to FIG. 8 that are described below).

In the following explanations, the X direction illustrated in the drawings indicates a longitudinal direction of the conductor unit in the present embodiment, that is, an arrangement direction of electrode terminals and a connection conductor. The Y direction indicates an up and down direction of the conductor unit in the present embodiment, that is, a direction orthogonal to the X direction. The Z direction indicates a depth direction of the conductor unit in the present embodiment, that is, a direction orthogonal to the X direction and the Y direction. Here, the Y direction indicates the up and down direction of the conductor unit, which is not limited to a vertical direction.

A conductor unit 1A illustrated in FIG. 1 to FIG. 4 is attached to a battery module (not illustrated in the drawings) constituted of a plurality of battery cells 2. The battery module is mounted on an electric vehicle (EV), a hybrid vehicle (HV, PHV), or the like, and used for supplying electric power to a rotary electric machine that is a driving source, or storing (charging) thereto electric power generated by the rotary electric machine. In the battery module, for example, the battery cells 2 are arranged in the same direction so that respective electrode terminals 2a on one side of the battery cells 2 can be aligned, and electrode terminals 2a on the other side of the battery cell 2 can be aligned. The electrode terminals 2a are pillar-shaped pole pillars that upwardly project from both ends of the battery cell in the longitudinal direction of the battery cell. In the battery module, the conductor unit 1A is attached to at least one of the electrode terminals 2a arranged in the same direction. The conductor unit 1A electrically connects the battery cell 2 with a battery monitoring unit 200 described below.

The conductor unit 1A includes a connection conductor 10A, a fusible body 20, a connection terminal 30, a resin-molded member 40, and a linear conductor 50. The conductor unit 1A includes the connection conductor 10A and the linear conductor 50 with the fusible body 20 and the connection terminal 30 interposed therebetween, all of these components being electrically connected with each other.

The connection conductor 10A is, for example, a bus bar, which is composed of a conductive material such as metal. The connection conductor 10A is directly connected with at least one electrode terminal 2a in an electrode terminal group of the battery cells 2 arranged in the same direction, and arranged along the arrangement direction of the electrode terminals 2a. The connection conductor 10A inserts the electrode terminal 2a into either one or both of two through holes 12 thereof so as to be fixed to the electrode terminal 2a with screws thus being directly attached to the electrode terminal 2a. Here, the connection conductor 10A may be directly attached to two electrode terminals 2a adjacent to each other in the arrangement direction of the battery cells 2. The connection conductor 10A includes, as illustrated in FIG. 2 and FIG. 3, a connection conductor body 11, the through holes 12, a connection portion 13A, and a projecting portion 14A.

The connection conductor body 11 is, as illustrated in FIG. 4, formed of a plate-like metal sheet or the like, the plate-like metal sheet being folded so as to make two folded parts overlap with each other. To be more specific, the connection conductor body 11 includes a first body part 11a, a second body part 11b, and a folded part 11c. The first body part 11a is a part being brought into contact with a battery-cell side face 2b from above in the Y direction. The battery-cell side face 2b is a surface on which the electrode terminal 2a is provided, the battery-cell side face 2b facing toward, for example, the upper direction of the vehicle. The second body part 11b is a part arranged on a side opposite to the battery-cell side face 2b with respect to the first body part 11a. The folded-back part 11c is a part at which the connection conductor body 11 is folded so that the first body part 11a and the second body part 11b overlap with each other. The connection conductor body 11 includes two through holes 12 that penetrate through the first body part 11a and the second body part 11b in the Y direction, that is, in the thickness direction of the connection conductor 10A. Each of the through holes 12 is a hole into which the electrode terminal 2a projects upwardly from the battery-cell side face 2b is inserted, the hole being formed by a punching process so that a connection portion to be connected with each of the battery cells 2 can remain.

The connection portion 13A and the projecting portion 14A constitute holding portions 100 that hold the resin-molded member 40. The holding portions 100 project in the direction orthogonal to the arrangement direction of the battery cells 2, and are disposed inside the resin-molded member 40. The connection portion 13A and the projecting portion 14A are each provided in at least one place in a spaced-apart manner from each other. To be more specific, the connection portion 13A and the projecting portion 14A are formed at respective positions spaced apart from each other along the longitudinal direction of the connection conductor 10A.

The connection portion 13A projects in the Z direction orthogonal to the arrangement direction of the battery cells 2 from the end of the connection conductor body 11 in the Z direction, and projects in a bending manner in the Y direction orthogonal to the arrangement direction of the battery cells 2. The connection portion 13A connects the fusible body 20 and the connection conductor 10A with each other. The connection portion 13A includes a fusible body connection portion 13a and a through hole 13b. The fusible body connection portion 13a allows a terminal 20a of the fusible body 20 to be inserted into a part thereof in which a slit is formed in a Y-shape in the Y direction, and engages the terminal 20a therewith so as to hold the terminal 20a thus being connected with the fusible body 20. The through hole 13b is formed in a penetrating manner in the Y direction, that is, in the thickness direction of the connection conductor 10A. A part of the resin-molded member 40 is disposed inside the through hole 13b in a state that the connection portion 13A is disposed in the resin-molded member 40.

The projecting portion 14A projects in the Z direction orthogonal to the arrangement direction of the battery cells 2 from the end of the connection conductor body 11 in the Z direction, and projects in a bending manner in the Y direction orthogonal to the arrangement direction of the battery cells 2. The projecting portion 14A has a through hole 14a that penetrates in the Y direction, that is, in the thickness direction of the connection conductor 10A. A part of the resin-molded member 40 is disposed inside the through hole 14a in a state that the projecting portion 14A is disposed inside the resin-molded member 40. At least one of the holding portions 100 preferably constitutes the connection portion 13A that electrically connects the fusible body 20 and the connection conductor 10A with each other.

The fusible body 20 is arranged in such a manner that the longitudinal direction of the fusible body 20 is aligned with respect to the connection conductor 10A along the X direction, that is, along the arrangement direction of the battery cells 2. The fusible body 20 is connected with the connection conductor 10A at one end thereof, and connected with the linear conductor 50 via the connection terminal 30 at the other end thereof. The fusible body 20 is, for example, an axial lead type fuse, which is fused when an overcurrent flows, and interrupts a corresponding current passage. That is, the fusible body 20 is fused when an overcurrent flows between the connection conductor 10A and the linear conductor 50 thus protecting the battery monitoring unit 200 connected with the linear conductor 50. The overcurrent of the fusible body 20 is, for example, an electric current equal to or greater than a rated current set in advance. That is, the fusible body 20 is fused when the electric current equal to or greater than the rated current set in advance flows. The rated current of the fusible body 20 is determined in accordance with an electric current flowing in each circuit to be protected. The fusible body 20 is, as illustrated in FIG. 2 and FIG. 3, constituted of a pair of lead wire type terminals 20a, and a fusing part 20b arranged between the pair of terminals 20a. One of the pair of terminals 20a is connected with the fusible body connection portion 13a of the connection conductor 10A, and the other terminal 20a is connected with the connection terminal 30. The fusing part 20b is, for example, an electric resistance body, which is, as mentioned above, fused when the electric current equal to or greater than the rated current set in advance flows.

The connection terminal 30 is a connection terminal composed of a conductive material such as metal, and physically and electrically connects the fusible body 20 and the linear conductor 50 with each other. The connection terminal 30 is connected with the connection conductor 10A via the fusible body 20 at one end thereof, and connected with the linear conductor 50 at the other end thereof. The connection terminal 30 includes a fusible body connection portion 30a, a caulking portion 30b, and a through hole 30c. The fusible body connection portion 30a is connected with the other terminal 20a of the fusible body 20. The fusible body connection portion 30a allows, in the same manner as the case of the fusible body connection portion 13a, the terminal 20a of the fusible body 20 to be inserted into a part thereof in which a slit is formed in a Y-shape, and engages the terminal 20a therewith so as to hold the terminal 20a thus being connected with the fusible body 20. The caulking portion 30b is connected with one end of the linear conductor 50 by crimping. The through hole 30c is formed in a penetrating manner in the Y direction, that is, in the thickness direction of the connection conductor 10A. A part of the resin-molded member 40 is disposed inside the through hole 30c in a state that the connection terminal 30 is disposed inside the resin-molded member 40.

The resin-molded member 40 is, for example, formed of an insulative synthetic resin material. The resin-molded member 40 contains, as illustrated in FIG. 3 and FIG. 4, the fusible body 20, the holding portions 100 of the connection conductor 10A, and a part of the connection terminal 30 therein. That is, the resin-molded member 40 is formed so as to cover the surface of the fusible body 20, the surface of the connection portion 13A, the surface of the projecting portion 14A, and the surface of a part of the connection terminal 30. The resin-molded member 40 is integrally formed with the connection conductor 10A, the fusible body 20, the connection terminal 30, and the linear conductor 50.

The resin-molded member 40 is formed so that an outside bottom surface 40a facing the battery cell 2 can be coplanar with the battery-cell side face 2b, or the outside bottom surface 40a is located on a side opposite to the battery cell 2 with respect to the battery cell side face 2b, in a state that the connection conductor 10A is connected with the electrode terminal 2a. When the resin-molded member 40 is formed so that the outside bottom surface 40a can be located on the battery cell 2 side of the battery cell side face 2b in a state that the connection conductor 10A is connected with the electrode terminal 2a, there exists the possibility that the resin-molded member 40 interferes with a peripheral part when the battery module is mounted on a vehicle. Accordingly, it is preferable to form the resin-molded member 40 so that the outside bottom surface 40a of the resin-molded member 40 can be coplanar with the battery-cell side face 2b, or the outside bottom surface 40a can be located on a side opposite to the battery cell 2 with respect to the battery cell side face 2b. The resin-molded member 40 in the present embodiment is, as illustrated in FIG. 4, formed so that the outside bottom surface 40a can be coplanar with the battery cell side face 2b. Here, the connection conductor body 11 is folded so as to make the first body part 11a and the second body part 11b each of which is formed in a plate-like shape overlap with each other, and the holding portions 100 project from the end of the second body part 11b in the Z direction. Accordingly, the outside bottom surface 40a of the resin-molded member 40 formed at the holding portion 100 is located upward by the thickness of the second body part 11b, thus preventing the outside bottom surface 40a from being located closer to the battery cell 2 side than the battery cell side face 2b.

As a method for forming the resin-molded member 40, insert molding using a metal mold may be available, for example. In this case, first of all, a molding object is formed, the molding object being such that the connection conductor 10A and the connection terminals 30 are connected with each other via the fusible body 20 by welding or the like, and the molding object is set inside a forming mold. Next, the forming mold is closed, molten resin is poured into the inside of the forming mold, the forming mold is opened after the resin solidifies, and a molded object is ejected. Unnecessary resin parts are removed from the resin-molded member 40 into which the molding object has been formed.

The linear conductor 50 is, as illustrated in FIG. 1, connected with the battery monitoring unit 200. To be more specific, one end of the linear conductor 50 is connected with the caulking portion 30b of the connection terminal 30 with insulating coating stripped therefrom to expose a core wire at the one end, and the other end of the linear conductor 50 is connected with the battery monitoring unit 200. The battery monitoring unit 200 monitors the battery conditions of the battery cells 2. The battery monitoring unit 200 is, for example, a voltage detecting device, which detects the terminal voltage of the battery cells 2. In this case, the linear conductor 50 constitutes a voltage detection line. The battery monitoring unit 200 includes, for example, an operational amplifier and an AD converter, and samples the terminal voltage of the battery cell 2 at predetermined periods to convert the terminal voltage into a digital signal to output the digital signal. The battery monitoring unit 200 is connected with an engine control unit (ECU) (not illustrated in the drawings) mounted on a vehicle, and outputs a value of the terminal voltage of the battery cell 2 to the ECU.

The fixing structure of the conductor unit 1A in the first embodiment explained heretofore includes the connection conductor 10A directly connected with at least one electrode terminal 2a in the electrode terminal group of the battery cells 2 arranged in the same direction, the linear conductor 50 connected with the battery monitoring unit 200 that monitors the battery conditions of the battery cells 2, the fusible body 20 that is connected between the connection conductor 10A and the linear conductor 50 and fuses when the overcurrent flows between the connection conductor 10A and the linear conductor 50, and the resin-molded member 40 that contains the fusible body 20 therein. The connection conductor 10A includes the holding portions 100 disposed inside the resin-molded member 40, and hold the resin-molded member 40. The holding portions 100 are formed in at least two places spaced apart from each other.

With the fixing structure of the conductor unit 1A constituted as above, the connection conductor 10A includes the holding portions 100 formed in at least two places spaced apart from each other, the holding portions 100 are disposed inside the resin-molded member 40 and hence, the connection conductor 10A is prevented from being dropped off from the resin-molded member 40, and the connection conductor 10A, the fusible body 20, and the connection terminal 30 are integrally formed with each other, thereby improving the rigidity and resistance against vibration of the conductor unit 1A. Furthermore, it is possible to eliminate a casing in which the conductor unit 1A is housed, thereby enabling the miniaturization and the weight reduction of the battery module, and reducing a component cost. Furthermore, the reduction of the number of the connection terminals and the number of electrical contacts reduces a resistance value when a current flows through the battery monitoring unit 200, thereby enabling the terminal voltage of the battery cell 2 to be detected with sufficient accuracy. Furthermore, the fusible body 20 is connected in between the connection conductor 10A and the linear conductor 50 thus protecting the conductor unit 1A and the battery monitoring unit 200 against overcurrent. In addition, in the fixing structure of the conductor unit 1A, the fusible bodies 20, a part of the connection conductor 10A, and a part of the connection terminal 30 are disposed inside the resin-molded member 40 and hence, it is possible to handle the connection conductor 10A, the fusible body 20, and the connection terminal 30 as one component. This eliminates the assembling process of the fuse and the connection terminal with respect to a casing in assembling, such as attaching a plurality of conductor units 1A to the battery module, thereby improving workability in the assembling process.

According to the fixing structure of the conductor unit 1A in the first embodiment explained heretofore, each of the holding portions 100 projects in the direction orthogonal to the arrangement direction of the battery cells 2, and at least one holding portion 100 is the connection portion 13A that electrically connects the fusible body 20 and the connection conductor 10A with each other. Due to such constitution, the connection portion 13A connected with the fusible body 20 constitutes the holding portion 100 of the resin-molded member 40, thereby simplifying the shape of the connection conductor 10A.

With the fixing structure of the conductor unit 1A in the first embodiment explained heretofore, in a state that the connection conductor 10A is connected with the electrode terminal 2a, the resin-molded member 40 is formed so that the outside bottom surface 40a facing the battery cell 2 can be coplanar with the battery cell side face 2b to which the electrode terminal 2a is provided, or the outside bottom surface 40a is located on a side opposite to the battery cell 2 with respect to the battery cell side face 2b, thereby attaching the conductor unit 1A to the battery module without interference between the resin-molded member 40 and peripheral components of the battery cell 2.

Furthermore, according to the fixing structure of the conductor unit 1A in the first embodiment explained heretofore, the holding portion 100 is formed in a plate-like shape, and provided with at least one through hole (13b, 14a), and the through hole (13b, 14a) contains a part of the resin-molded member 40 therein and hence, the resin-molded member 40, a part of which is disposed inside the through hole (13b, 14a), is capable of preventing the connection conductor 10A and the resin-molded member 40 from easily separating from each other.

Second Embodiment

Figure 5:
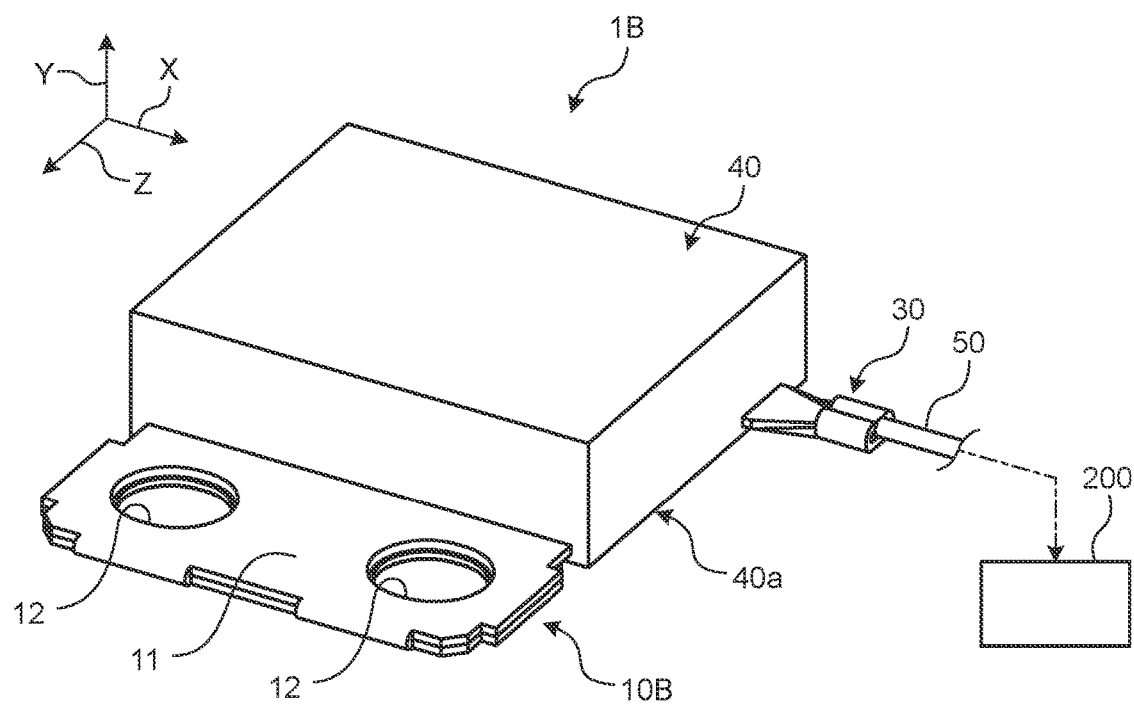
FIG. 5 is a perspective view illustrating one example of an external appearance of a fixing structure of a conductor unit according to a second embodiment.
Figure 6:
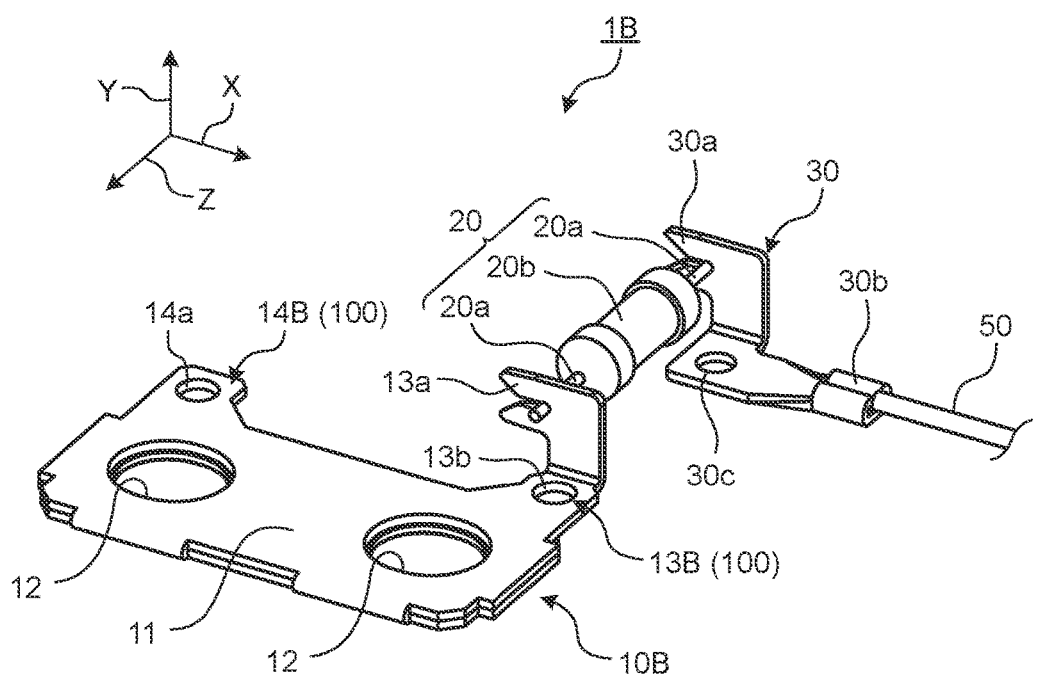
FIG. 6 is a perspective view illustrating a schematic structure of the fixing structure of the conductor unit according to the second embodiment.
Figure 7:
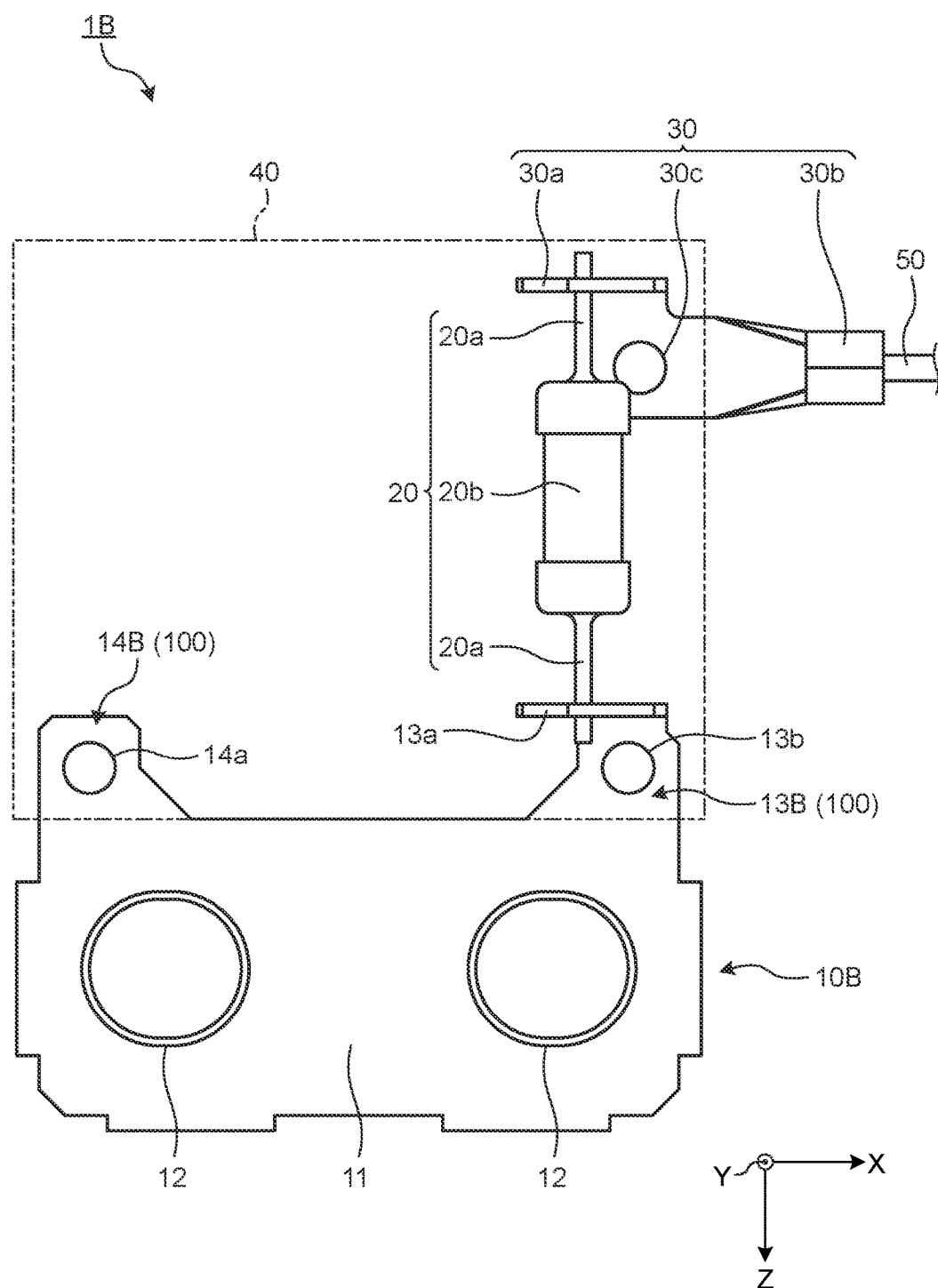
FIG. 7 is a plan view illustrating the schematic structure of the fixing structure of the conductor unit according to the second embodiment.
Figure 8:
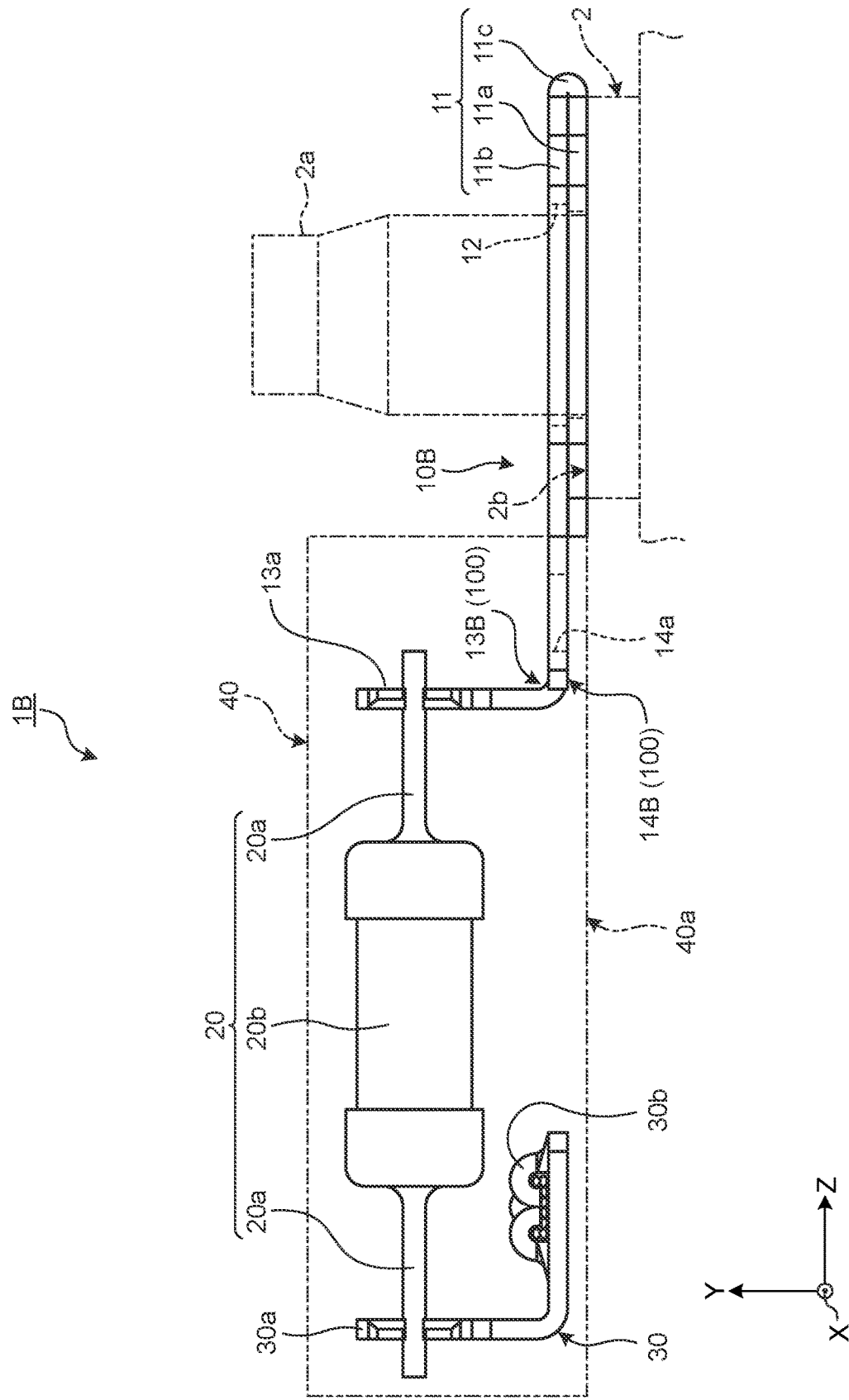
FIG. 8 is a side view illustrating the schematic structure of the fixing structure of the conductor unit according to the second embodiment.

Next, a fixing structure of a conductor unit according to a second embodiment is explained. FIG. 5 is a perspective view illustrating one example of the external appearance of the fixing structure of the conductor unit according to the second embodiment. FIG. 6 is a perspective view illustrating the schematic structure of the fixing structure of the conductor unit according to the second embodiment. FIG. 7 is a plan view illustrating the schematic structure of the fixing structure of the conductor unit according to the second embodiment. FIG. 8 is a side view illustrating the schematic structure of the fixing structure of the conductor unit according to the second embodiment.

In a fixing structure of a conductor unit 1B according to the second embodiment, as illustrated in FIG. 5 to FIG. 8, the fusible body 20 is arranged in such a manner that the longitudinal direction of the fusible body 20 extends along a direction (Z direction) orthogonal to the arrangement direction of the battery cells with respect to a connection conductor 10B. That is, a holding portion 100 of the connection conductor 10B differs in shape from the holding portion 100 of the connection conductor 10A mentioned above. As for constitutions, operations, and advantageous effects that are identical with those in the first embodiment, their repeated explanations are omitted as much as possible (the same applies hereafter).

The conductor unit 1B includes, as illustrated in FIG. 6 to FIG. 8, the connection conductor 10B, the fusible body 20, the connection terminal 30, the resin-molded member 40, and the linear conductor 50. In the conductor unit 1B, the fusible body 20 and the connection terminal 30 are connected between the connection conductor 10B and the linear conductor 50, these components being electrically connected with each other.

The connection conductor 10B is a bus bar, which includes the holding portions 100 each of which is different in configuration from the corresponding holding portions 100 of the connection conductor 10A mentioned above. The holding portions 100 include a connection portion 13B and a projecting portion 14B. The connection portion 13B projects in the Z direction orthogonal to the arrangement direction of the battery cells from the end of the connection conductor body 11 in the Z direction, and projects in a bending manner in the Y direction orthogonal to the arrangement direction of the battery cells. The connection portion 13B connects the fusible body 20 and the connection conductor 10B with each other. The connection portion 13B includes the fusible body connection portion 13a and the through hole 13b. The projecting portion 14B projects in the Z direction orthogonal to the arrangement direction of the battery cells from the end of the connection conductor body 11 in the Z direction. The projecting portion 14B has the through hole 14a. A part of the resin-molded member 40 is disposed inside the through hole 14a in a state that the projecting portion 14B is disposed inside the resin-molded member 40.

The fixing structure of the conductor unit 1B in the second embodiment explained heretofore includes the connection conductor 10B directly connected with at least one electrode terminal 2a in the electrode terminal group of the battery cells 2 arranged in the same direction, the linear conductor 50 connected with the battery monitoring unit 200 that monitors the battery conditions of the battery cells 2, the fusible body 20 that is connected between the connection conductor 10B and the linear conductor 50, and fuses when an overcurrent flows between the connection conductor 10B and the linear conductor 50, and the resin-molded member 40 that contains the fusible body 20 therein. The connection conductor 10B includes the holding portions 100 that are disposed inside the resin-molded member 40 and that hold the resin-molded member 40. The holding portions 100 are formed in at least two places spaced apart from each other.

With the fixing structure of the conductor unit 1B constituted as mentioned above, the connection conductor 10B includes the holding portions 100 formed in at least two places spaced apart from each other, and the holding portions 100 are disposed in the resin-molded member 40, thereby acquiring advantageous effects same as those acquired in the case of the fixing structure of the conductor unit 1A in the first embodiment.

Modification

Figure 9:
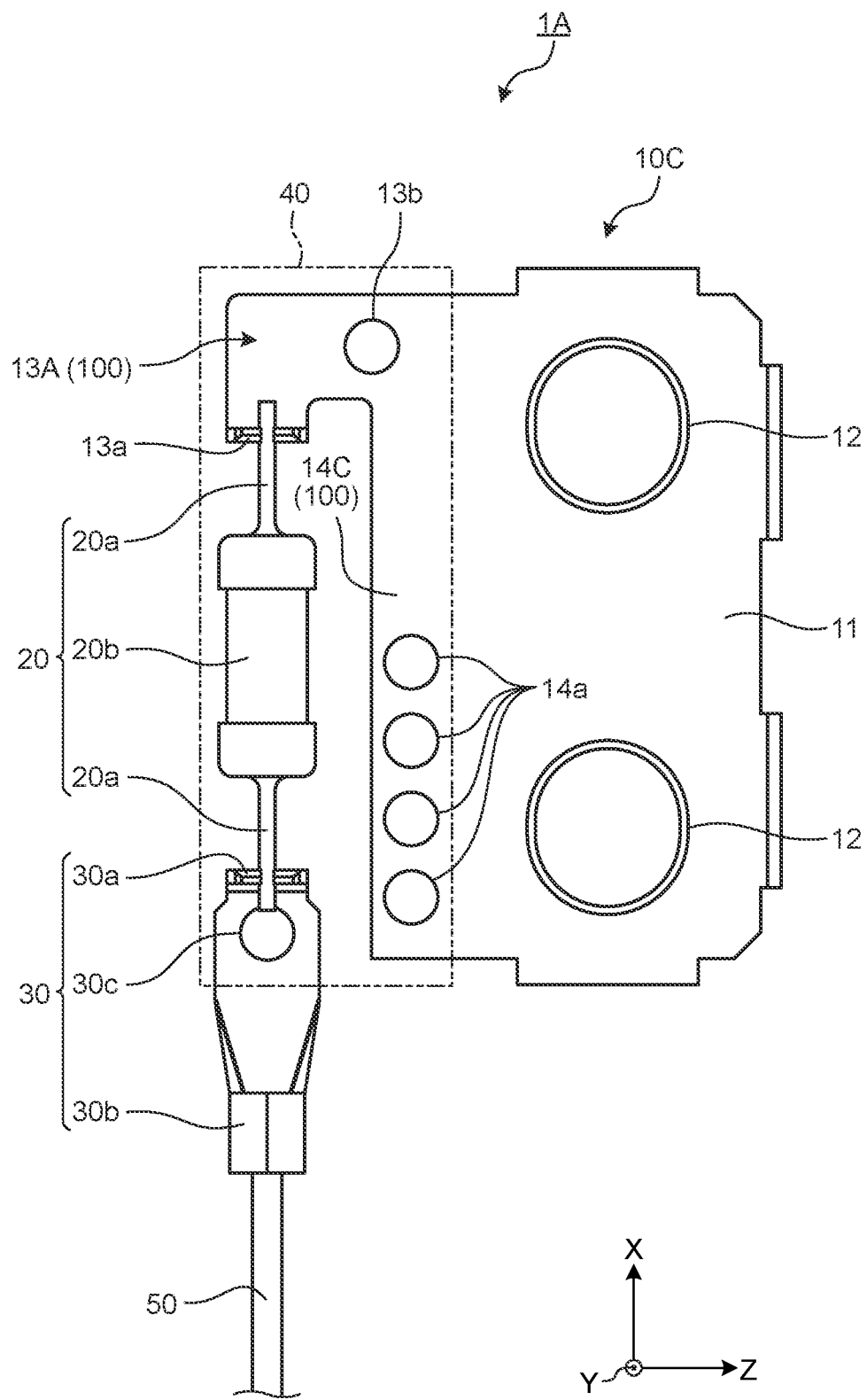
FIG. 9 is a plan view illustrating a schematic structure of a modification of a fixing structure of a conductor unit.

Here, in the first and second embodiments, although the holding portions 100 are formed in two places spaced apart from each other with respect to each of the connection conductors 10A and 10B, the present invention is not limited to these embodiments. FIG. 9 is a view illustrating a modification of the fixing structure of the conductor unit, that is, one example of the holding portion 100 that is not separated into two parts. In the holding portion 100 illustrated in the drawing, the connection part 13A and a projecting portion 14C are continuously formed along the arrangement direction of a connection conductor 10C. The holding portion 100 is disposed in the resin-molded member 40, and holds the resin-molded member 40. The holding portion 100 is formed in a plate-like shape, and provided with a plurality of through holes 14a in the projecting portion 14C thereof. A part of the resin-molded member 40 is disposed inside each of the through holes 14a in a state that the holding portion 100 is disposed inside the resin-molded member 40.

Furthermore, in the first and second embodiments mentioned above, although the holding portion 100 forms one through hole (13b, 14a) in each of the connection portion (13A, 13B) and the projecting portion (14A, 14B), the present invention is not limited to these embodiments, and a plurality of the through holes (14a) may be formed, as illustrated in FIG. 9.

Furthermore, in the first and second embodiments mentioned above, although each of the connection conductors 10A and 10B is a bus bar, the present invention is not limited to these embodiments. That is, each of the connection conductors 10A and 10B may be indirectly connected with at least one electrode terminal 2a in the electrode terminal group of the battery cells 2 arranged in the same direction via a bus bar. In this case, each of the connection conductors 10A and 10B is physically and electrically connected with the bus bar. Each of the connection conductors 10A and 10B and the bus bar are connected with each other by using a fitting structure, a welding structure, a screw-fastening structure, or the like.

Furthermore, in the first and second embodiments mentioned above, the circuit configuration of the battery monitoring unit 200, or the like is not limited particularly. It is preferable for the battery monitoring unit 200 to be, for example, constituted so as to detect a terminal voltage of each battery cell and a total terminal voltage of a battery pack.

Furthermore, in the first and second embodiments mentioned above, although the connection portion (13A, 13B) inserts the terminal 20a of the fusible body 20 into a part thereof in which a slit is formed in a Y-shape, and engages the terminal 20a therewith so as to hold the terminal 20a thus being connected with the fusible body 20, the present invention is not limited to these embodiment, and the connection portion (13A, 13B) may be connected with the fusible body 20 by welding, soldering, screw-fastening, or the like.

Furthermore, in the first and second embodiments mentioned above, although the fusible body 20 and the linear conductor 50 are connected with each other via the connection terminal 30, the fusible body 20 and the linear conductor 50 may be directly connected with each other without the connection terminal 30 interposed therebetween.

In addition, in the first and second embodiments mentioned above, as illustrated in the drawings, although the connecting direction of the linear conductor 50 with respect to the connection conductor (10A, 10B) is specified, the present invention is not limited to these embodiments.

According to the fixing structure of the conductor unit according to the embodiment, it is possible to improve the rigidity and resistance against vibration of the conductor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A fixing structure of a conductor unit comprising:
a connection conductor that is connected directly or indirectly with at least one electrode terminal in an electrode terminal group of a plurality of battery cells arranged in a same direction;
a linear conductor connected with a battery monitoring unit configured to monitor the battery conditions of the battery cells;
a fusible body that is connected between the connection conductor and the linear conductor, the fusible body being configured to fuse when an overcurrent flows between the connection conductor and the linear conductor; and an insulative resin-molded member that contains the fusible body inside the insulative resin-molded member, wherein the connection conductor includes holding portions that are disposed inside the resin-molded member and hold the resin-molded member, the holding portions are formed in at least two places spaced apart from each other, the holding portion is formed in a plate-like shape, and provided with at least one through hole, and a part of the resin-molded member is disposed inside the through hole.

2. The fixing structure of the conductor unit according to claim 1, wherein each of the holding portions projects in a direction orthogonal to the arrangement direction of the battery cells, and at least one of the holding portions serves as a connection portion configured to electrically connect the fusible body and the connection conductor with each other.

3. The fixing structure of the conductor unit according to claim 1, wherein the resin-molded member is formed in such a manner that an outside bottom surface of the resin-molded member facing the battery cells is located coplanar with a side face of the battery cells or located on a side opposite to the battery cells with respect to the side face of the battery cells, in a state where the connection conductor is connected with the electrode terminal.

4. The fixing structure of the conductor unit according to claim 2, wherein the resin-molded member is formed in such a manner that an outside bottom surface of the resin-molded member facing the battery cells is located coplanar with a side face of the battery cells or located on a side opposite to the battery cells with respect to the side face of the battery cells, in a state where the connection conductor is connected with the electrode terminal.

\* \* \* \* \*